H. English
Hydrant Valve
Nº 14,557.    Patented Apr. 1, 1856.
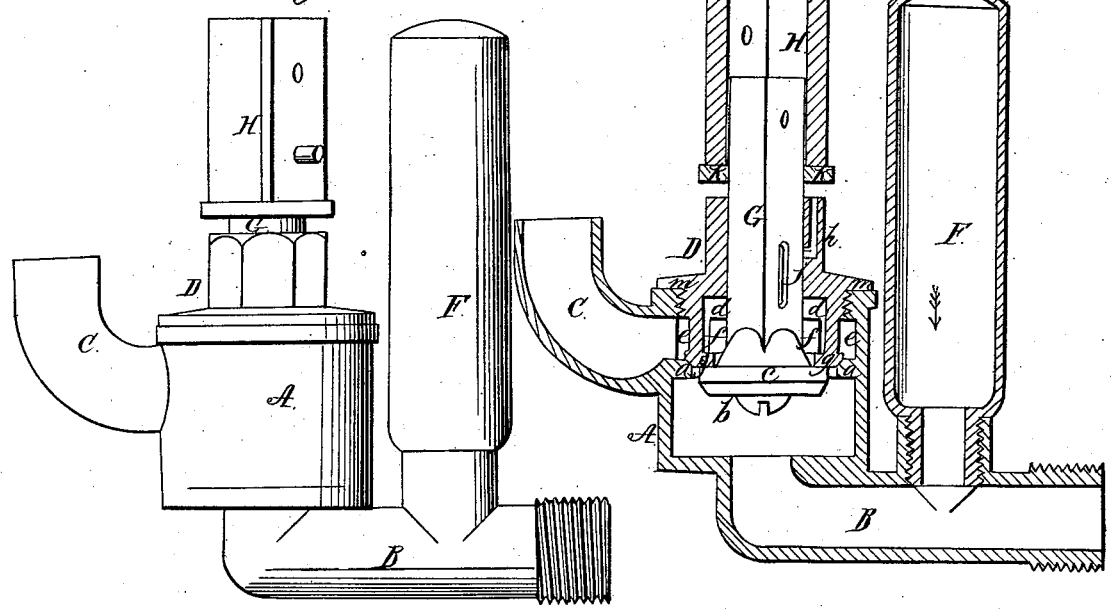
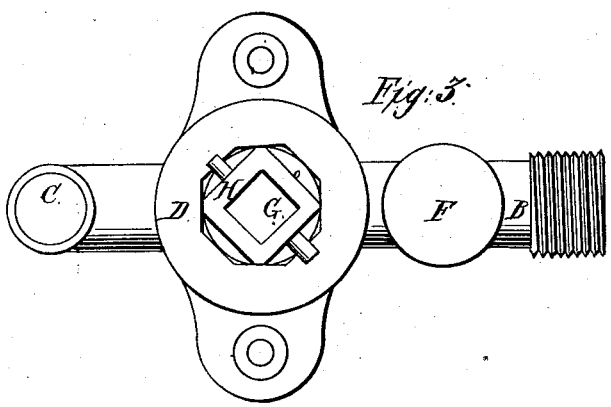
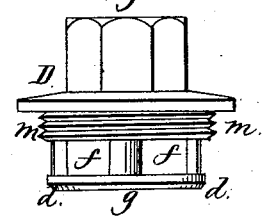
Witnesses:
Edward John Baker
John Cochrane
Inventor:
Henry English

UNITED STATES PATENT OFFICE.

HENRY ENGLISH, OF BALTIMORE, MARYLAND.

HYDRANT.

Specification of Letters Patent No. 14,557, dated April 1, 1856.

*To all whom it may concern:*

Be it known that I, HENRY ENGLISH, of the city of Baltimore and State of Maryland, brass finisher, have invented certain new and useful Improvements in the Construction of Hydrant-Valves; and I do hereby declare that the following is a full and exact description thereof, reference being had to the accompanying drawings, in which—

Figure 1, is a side elevation, Fig. 2, a vertical longitudinal section, Fig. 3 a top view or plan, and Fig. 4, an elevation of the cap piece; and the same letters are used to designate the some parts in all the figures.

Hydrant valves, as commonly constructed are found in practice to have several imperfections; those imperfections or difficulties will be obviated or removed by my improved mode of construction.

In Figs. 1 and 2, A is the valve box, B the pipe through which the water is received from the reservoir or main pipe and C is the discharging pipe. The valve box A, Fig. 2, is divided into an upper and lower chamber, which communicate with each other by means of a passage or opening which is controlled by the hanging valve $b$, this valve opens against the pressure of the water from the receiving pipe B and is faced with the leather washer $c$ for the purpose of making a close joint and of softening the impact of the valve against its seat when closing. When the valve $b$ is pressed down from its seat $g, g$, the water passes around and over it from the lower chamber through the opening in the valve seat into the interior cavity $d\ d$ of the cap piece D, from this cavity the water passes into the circular channel $e\ e$ between the central cavity $d\ d$ and the external valve-box A, by means of the openings $f\ f$, Figs. 2 and 4. With this circular channel the discharge pipe C communicates freely, so that on pressing down the valve $b$, a free passage is given to the water from the receiving pipe B to the discharging pipe C, but on removing this downward pressure from the valve $b$ the force or pressure of the water in the lower chamber will immediately cause it to close, and thus stop the flow of water from the hydrant. The sudden interruption of this flow through the receiving pipe B causes a considerable jar on the pipe B, to relieve which I put on this pipe the air vessel F which has the desired effect.

The closing of the valve $b$ leaves the discharging pipe $c$ full of water, to prevent the freezing of which in cold weather, it is usual to allow this water to escape into the ground, at a point so far below its surface as to be out of the reach of the frost, by means of what is termed a waste vent. I accordingly furnish my hydrant valve with a waste vent, as shown at $h$ Fig. 2, connecting with the groove $j$ in the valve stem or shank G. This stem or shank is made four sided or of a square section, so that when it is desirable that the waste vent shall not be used, the side of the stem or shank which contains the groove $j$ can be turned or placed in such a position as not to connect with the waste vent $h$. To prevent the escape of water from the waste vent when the hydrant is running, I place around the shank G the leather washer $k\ k$, which is pressed down on the vent $h$, by the lower edge of the coupling H; thus the downward motion of the coupling H, closes the vent $h$ and opens the valve $b$, and its upward movement will close the valve $b$ and open the waste vent $h$.

The cap piece D is screwed into the valve box A, as shown in Fig. 2, the screw is also shown at $m$, Fig. 4, and makes two joints with the valve box, one at $a\ a$, which separates the lower from the upper chamber, and the other at $m\ m$, where the lip of the cap closes down on the top edge of the valve box; accordingly, by unscrewing the cap-piece D, which can be done from the top of the hydrant, by means of the rod which connects the handle with the socket H, and the square shank $h$ of the valve which passes through the cap piece D and thus the valve and seat, the whole operating part of the hydrant, can be removed and brought up for repairs or examination, and be again separated without breaking the ground or disturbing the fixtures of the hydrant.

The advantages of this hydrant over those in common use are 1st, the pressure of the water from the service pipe or reservoir keeps the valve close to its seat without the aid of springs or weights; 2nd, the mere shifting of the square shank in the cap piece, will stop the waste vent or bring it into operation as may be desired; 3d, the facility with which the operating parts can be removed and brought up for repairs or examination and be again replaced, without breaking the ground or disturbing the fixtures of the hydrant.

Having thus described the construction and nature of my improved hydrant valve what I claim as my invention and desire to secure by Letters Patent is—

The combination of the square shanked valve and its seat with the cap piece, in the manner and for the purpose substantially as described.

HENRY ENGLISH.

Witnesses:
 EDWARD JOHN BAKER,
 JOHN COCHRANE.